US012353607B2

(12) United States Patent
Renn et al.

(10) Patent No.: US 12,353,607 B2
(45) **Date of Patent: *Jul. 8, 2025**

(54) DIGITAL FILE FORENSIC ACCOUNTING AND MANAGEMENT SYSTEM

(71) Applicant: Forensifile, LLC, Raleigh, NC (US)

(72) Inventors: Donna Renn, Norlina, NC (US); Lawrence Franklin Gibbs, Wake Forest, NC (US)

(73) Assignee: FORENSIFILE, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/630,518

(22) Filed: Apr. 9, 2024

(65) Prior Publication Data

US 2024/0265151 A1 Aug. 8, 2024

Related U.S. Application Data

(63) Continuation of application No. 17/427,694, filed as application No. PCT/US2021/022646 on Mar. 17, 2021, now Pat. No. 11,966,502.

(60) Provisional application No. 62/990,880, filed on Mar. 17, 2020.

(51) Int. Cl.
*G06F 21/64* (2013.01)
*G06F 21/60* (2013.01)

(52) U.S. Cl.
CPC .......... *G06F 21/645* (2013.01); *G06F 21/602* (2013.01)

(58) Field of Classification Search
None
See application file for complete search history.

(56) References Cited

U.S. PATENT DOCUMENTS 6,167,513 A * 12/2000 Inoue .................. H04L 63/0428 713/168
6,538,623 B1 3/2003 Parnian et al.
7,415,476 B2 * 8/2008 Borrowman .......... H04L 9/3297 707/999.102
7,590,659 B2 9/2009 Yogesh et al.
(Continued)

FOREIGN PATENT DOCUMENTS

WO 2018217191 A1 11/2018
WO 2020046575 A1 3/2020

*Primary Examiner* — Kambiz Zand
*Assistant Examiner* — Mahabub S Ahmed
(74) *Attorney, Agent, or Firm* — Invention To Patent Services; Alex Hobson

(57) ABSTRACT

A digital file forensic accounting and management system collects forensic data for a digital file that is stored and accounted for in a datastore. The digital files and the associated forensic data may be retrieved from the datastore by a third party to verify the authenticity of the digital file. An interface program is utilized to collect forensic data about a file upon creation of the file and/or when the file is transferred to the datastore. An interface program may be a framework that is operated on a file producing program that a file provider used to create a digital file. An interface program may be an origination driver that is operated on the file providing computer. An interface program may be a directory monitoring program that transfers the digital file and forensic data to the datastore upon saving the file to the monitored directory.

20 Claims, 8 Drawing Sheets

(56) References Cited

U.S. PATENT DOCUMENTS 7,690,042 B2 * 3/2010 Rantalahti .............. H04W 12/08 709/248
9,507,936 B2 11/2016 Hoog
10,279,805 B2 5/2019 Hattori et al.
10,546,133 B2 1/2020 Griffin et al.
10,565,221 B2 2/2020 Kordasiewicz et al.
2001/0002485 A1 * 5/2001 Bisbee .............. G07F 7/12 705/51
2002/0001395 A1 * 1/2002 Davis .............. G06F 21/10 705/317
2003/0120940 A1 * 6/2003 Vataja .............. H04L 67/52 380/258
2003/0187873 A1 10/2003 Paffe et al.
2005/0246376 A1 * 11/2005 Lu .............. G06F 11/1448
2005/0259289 A1 * 11/2005 Ferlitsch .............. G06K 15/1807 358/1.14
2008/0065315 A1 3/2008 Guy et al.
2008/0133940 A1 * 6/2008 Laurie .............. G06F 21/64 713/193
2010/0005073 A1 * 1/2010 Bousquet .............. G06F 16/2465 707/E17.014
2011/0153748 A1 6/2011 Lee et al.
2011/0295886 A1 12/2011 Bousquet et al.
2012/0166456 A1 6/2012 Kim et al.
2013/0204786 A1 * 8/2013 Mattes .............. G06Q 20/40145 705/44
2014/0046909 A1 * 2/2014 Patiejunas .............. G06F 16/24554 707/687
2014/0075493 A1 * 3/2014 Krishnan .............. H04L 67/52 726/1
2014/0181975 A1 * 6/2014 Spernow .............. G06F 21/568 726/23
2015/0169871 A1 * 6/2015 Achutha .............. G06F 21/52 726/1
2015/0310188 A1 * 10/2015 Ford .............. H04L 63/101 726/28
2016/0078245 A1 * 3/2016 Amarendran .............. G06N 20/00 713/193
2016/0283920 A1 * 9/2016 Fisher .............. H04L 9/3239
2017/0140492 A1 * 5/2017 Leonard .............. H04N 1/00106
2018/0248701 A1 * 8/2018 Johnson .............. H04L 9/3297
2019/0073497 A1 * 3/2019 Burchell .............. G06K 7/10366
2020/0042698 A1 * 2/2020 Urias .............. G06F 9/545
2020/0210620 A1 * 7/2020 Haletky .............. G06N 20/00
2020/0272748 A1 * 8/2020 Davidson .............. G06F 21/602
2020/0372163 A1 * 11/2020 Chung .............. G06F 21/6209
2020/0389313 A1 * 12/2020 Singh .............. H04L 9/0637

* cited by examiner

DIGITAL FILE FORENSIC ACCOUNTING AND MANAGEMENT SYSTEM

CROSS REFERENCE TO RELATED APPLICATIONS

This application is a continuation of U.S. patent application Ser. No. 17/427,694, which is a national stage entry of international application PCT/US2021/022646 filed on Mar. 17, 2021, which claims the benefit of priority to U.S. provisional patent application No. 62/990,880, filed on Mar. 17, 2020; the entirety of each prior application is hereby incorporated by reference herein.

BACKGROUND OF THE INVENTION

Field of the Invention

The invention relates a digital file forensic accounting and management system that acquires forensic data for digital files and provides a database for said files for retrieval and accounting.

Background

There are a wide array of circumstances where a digital file is required and proof of authenticity of the file is desired or required. Unfortunately, a file provider can, in many circumstances, modify a file that they are providing for certification. A file receiver may simply trust that a digital file is authentic and unaltered. For example, a software provider may have to certify that they are Payment Card Industry ("PCI") compliant before providing the software to a customer. The software provider may have to provide proof that they are PCI compliant, such as providing a copy of a software assessment or proofs or artifacts including proof of insurance and proof of vulnerabilities. The documents provided by the assessment companies are sent to the software provider and are then typically provided by the software provider to their potential customer. The software provider may alter the finding of the assessment or certification before providing the report to the customer. This practice can put the customer at risk and leave them liable for damages resulting from utilizing the software providers software.

SUMMARY OF THE INVENTION

The invention is directed to a proactive digital file forensic accounting and management system that proactively and dynamically collects forensic data for a digital file that is stored and accounted for in a datastore. The collection of the forensic data for the associated digital file at the time of creation of the digital file improves the efficiency of the forensic accounting system and computing system by ensuring the data is authentic as the creation of the file is controlled through the proactive digital file forensic accounting and management system. This provides for a more reliable system that people and companies can entrust for receiving authentic digital files. The digital files and the associated forensic data may be retrieved from the datastore to verify the authenticity of the digital file. For example, a software provider may be required to certify that they are PCI compliant before a new customer will purchase or license the software from the software provider. The software provider may employ a PCI auditor to provide PCI compliance certifications to the new customer. The PCI auditor may have a framework provided by the exemplary digital file forensic accounting and management system that collects forensic data about the PCI compliance digital file and this digital file and associated forensic data may be transferred to a datastore. This file package, the digital file and forensic data, may be encrypted with an encryption program prior to the file package being transferred to the datastore. The potential new customer may receive the PCI compliance document and associated forensic data from the datastore and be sure that the digital file is authentic and not altered in anyway. An exemplary digital file forensic accounting and management system may also use an origination driver that is operated by a file providing computer to collect forensic data about a digital file. The origination driver may be used in the transfer of the digital file and forensic data to the datastore. An exemplary digital file forensic accounting and management system may utilize a directory monitoring program that collects forensic data about a digital file when it saved into a monitored directory. The directory monitoring program then sends the collected forensic data upon creation of the digital file to the datastore along with a chain of custody for the digital file.

The digital files and forensic data associated with the digital file, a file package, may be retrieved from a datastore but may not be altered within the datastore. A system computer may track any retrieval of a digital file or file package from the datastore for future review. A record of access to a digital file may be part of a chain of custody recorded by the digital file forensic accounting and management system.

An exemplary digital file forensic accounting and management system utilizes an interface program to collect forensic data regarding a digital file that is provided to a datastore. An interface program may be a framework that is operated on a file providing computer or operated by a file producing program. A framework may be code that is licensed by a file producing program company, such as an accounting company, a records company, a compliance company and the like. This code or Application Program Interface (API) may be integrated into their own software program or file producing program, to provide the required functions of the digital file forensic accounting and management system. The code may include libraries and encryption program or software for encrypting the digital file before transfer to the datastore. A file provider may have to provide a file to third party and may use the file producing program to produce the file. Upon creating the file, the framework may then collect the forensic data and transfer the file along with the forensic data to a datastore. A third party may then retrieve the file package from the datastore including the digital file and the forensic data. A framework may utilize an origination driver to transfer the file package to the datastore and a framework may utilize an encryption program, software or code to encrypt the digital file and/or forensic data before transfer to the datastore.

An exemplary digital file forensic accounting and management system utilizes an interface program to collect forensic data regarding a digital file that is provided to a datastore. An interface program may be an origination driver that is operated on a file providing computer. The origination driver may have software to send a digital file and forensic data to the datastore, and may operate like a print driver, wherein the file provider prints using the origination driver to the datastore. When the digital file is transferred, the forensic data, such as the time, date, geolocation of origination, computer identification for producing the digital file and the like are transferred to the datastore. A third party may then retrieve the file package from the datastore including the digital file and the forensic data. An origination driver may utilize an encryption program, software or code to encrypt the digital file and/or forensic data before transfer to the datastore.

An exemplary digital file forensic accounting and management system utilizes an interface program to collect forensic data regarding a digital file that is provided to a datastore. An interface program may be a directory monitoring program that is operated on a file providing computer or within the cloud. The directory monitoring program may have software to send a digital file and forensic data to the datastore when the digital file is saved into a monitored directory. The directory monitoring program may not allow files to be opened from the monitored directory or modified in any way in the monitored directory. A file in a monitored directory may not be stored in the monitored directory and may be transferred to a datastore. A digital file saved in the monitored directory may be sent to a datastore for retrieval by a third party. Note the that the third party and the file provider may be part of the same company and the datastore may be the company's database or datastore. A directory monitoring program may utilize an encryption program, software or code to encrypt the digital file and/or forensic data before transfer to the datastore.

A datastore may be a database of a company that collects digital files for said company. A datastore may be part of a digital file forensic accounting and management system that is operated by a separate company from the file producing software or a file provider. An exemplary digital file forensic accounting and management system may manage the datastore and keep records of any access to the digital files in the datastore. Each time a digital file is retrieved from the datastore, the digital file forensic accounting and management system, utilizing a system program, may keep a record, including retrieval forensic data of the transfer of the digital file. This retrieval forensic data may include data about the digital package provided and information about the requestor, such as any of the forensic data defined herein including, date and time of retrieval, retrieving computer ID, retrieving geodata or location of retrieving computer, etc. Also, retrieved data may be encrypted before being transferred to a third party and may utilize an encryption program, software or code to encrypt the digital file and/or forensic data before transfer to the third party.

An exemplary digital file forensic accounting and management system may include a virtual machine for interface by a file providing computer. A virtual machine may include a virtual machine website that a file producing computer access to provide a digital file to the datastore. The system computer of the digital file forensic accounting and management system may operate the virtual machine or be linked with the virtual machine.

In an exemplary embodiment, a file producing computer logs into or otherwise access the virtual machine, such the virtual machine website, to provide a digital file directly from the file providing computer. Again, the file providing computer may run an interface program to enable forensic data to be collected and submitted along with the digital file.

In another embodiment, the file producing computer access a file origination computer through the virtual machine. A file provider may access the virtual machine website and then access a file origination website through the virtual machine. The virtual machine may have links for the file provider to access file origination websites. The file provider may have to log into the virtual machine and may also have to log into the file origination website before creating a digital file through the file origination interface and website. The digital file and associated forensic data may be transferred directly from the file origination computer or file origination database to the datastore through the system computer.

A file producing computer may interface with a file origination computer through a file origination website. The file origination computer may operate an interface program to enable a digital file and associated forensic data to be transferred directly to the system computer from the file origination computer. A file provider may access the file origination website through their file providing computer and produce a digital file through the file origination website. The file origination website and computer may license the interface program to allow for direct transfer to the datastore.

An exemplary file producing computer may be a mobile device, such as a mobile phone and an interface program may be an App that operates on the mobile device. The interface program may include a print driver to enable forensic data about a scan produced by the mobile device to be provided along with the scan, or digital file, to the datastore. A mobile device may use a camera of the mobile device to produce a scan of a file to produce the digital file.

Benefits of The Digital File Forensic Accounting And Management System

An exemplary digital file forensic accounting and management system addresses data integrity, data recovery, data location and imaging. This is done by interfacing with a file producing computer or file providing computer through an interface program to collect the associated forensic data at the time of creation of the digital file versus after an incident which would require multiple tools and a disk image. This proactive collection of forensic data at the time of file creation ensures integrity of the file and authenticity of the forensic data. This enables a new means of collecting forensic data and improves the efficiency of the computing system for this purpose.

An exemplary digital file forensic accounting and management system controls digital files in a datastore and allows third parties to retrieve the digital file and forensic data but these third parties are not allowed to modify these files in any way. An access log may be kept for all parties given access to the digital file and forensic data. This is a dynamic chain of custody for the lifetime of the file. In traditional forensics, this would only start after legal seizure of a disk and an investigation begins. Our product preserves the file with the forensics data at the point of creation and maintains that chain of custody forever. There are no gaps.

Management of the digital file in a controlled datastore by a system computer improves issues relating to obfuscation, data hiding and malware designed to prevent or mislead forensic analysis. Since the forensics are gathered and stored up front, there is no chance for someone to tamper or change and forensic data.

Incident first responders: Verifying the trustworthiness of cloud providers, response time and reconstruction. An exemplary digital file forensic accounting and management system verifies the trustworthiness of cloud providers, response time and reconstruction as the interface program is licensed to specific file producers that may be cloud based with respect to file provider interface. If forensics is needed and the data is located on a cloud provider, legal action must be taken against the file owner and the cloud provider. The cloud provider is forced to turn over other client's files that may be on the same disk they would have to image and will be hesitant to turn that information over. This results in a lot of privacy issue.

Definitions:

Forensic data, as used herein includes, but is not limited to, metadata including document metadata, time and date data, such as time and date of origination or document creation, modification date, geolocation data including location of creation and modification, origination software data or the software used to create digital file, created by data, application name, document title, author of the document, identified user creating the file, couple keywords, word count, character count, character count with spaces, file size, number of pages, computer data, such as computer ID or computer name, computer owner, logged in ID, operating system forensics, application data forensics, path, owner, group(unix) file permissions on operating system (OS), address of computer, MD5 Hash, SHA-1 Hash, SHA-256 Hash, file signature, and the like.

A computer, as used herein, is a computing device that can create directly or interface with a file producing program to create a digital file and includes a personal computer, laptop, mobile device including a tablet computer or mobile phone.

Data collection involves identification and preservation as well as collecting, analyzing, and reporting data.

Electronic discovery utilizes all those processes and generally collects active data.

Active data is classified as information and data that is easily available through file storage and program managers utilized by a business or individual.

A forensic analysis of data is needed when the litigation requires a deeper look at the data. A digital forensic specialist sorts through data in search of hidden files or deleted data to help provide more-reliable evidence.

Data being stored automatically. After many years of digital backups, automatically stored data may have been removed from a server. Forensics can discover this data typically located on a hard drive.

Deleted data. Any files that have been deleted from the system will usually remain on the computer's hard drive. Forensics will be used to locate this information as long as the hard drive has not been overwritten or wiped.

Wiping software. Most computer forensic specialists can determine if any hard drive wiping software was used on a computer. This can help make a case that data was destroyed purposely.

Framework, as used herein, is software that enables the functions and procedures allowing the integration of software applications into a larger software package. Framework may include Application Program Interface (API), code libraries and other programs.

Payment Card Industry (PCI), as used herein, is an industry standard designed to make it safer to use credit cards online by making sure that business collecting credit card data transmit and store it securely.

A virtual machine is accessed through the internet by a file provider and may include a website that the file provider interfaces with, a system computer that operates a system software program. A file provider may have to log into the virtual machine using a login and password and the virtual machine may obtain forensic data regarding the file provider including location information, computer origination information and the like. A virtual machine may utilize an interface program that operates on the system computer, the file providing computer and/or on a file origination computer and/or file origination database.

Example 1

PCI Compliance

A software provider is in negotiations with a new potential customer. The software provide has been requested to provide proof of PCI compliance. An exemplary digital file forensic accounting and management system may be used to provide certified PCI compliance data to the new potential customer. A PCI compliance company may have compliance software that includes a framework provided by the digital file forensic accounting and management system. The software provider may utilize the PCI compliance software that collects forensic data about a PCI compliance digital file. The PCI compliance digital file may include software assessment or proofs or artifacts including proof of insurance and proof of vulnerabilities. This PCI compliance digital file and associated forensic data may then be send to a datastore and subsequently retrieved by the potential new customer. The new customer can then be sure that the assessment and certifications are authentic.

Example 2

Loan Approval

A new home buyer is seeking loan approval. They are working with a bank to secure a loan for the new home. The bank may require the home buyer to transfers one or more files to the bank's datastore via an origination driver. The origination driver may be provided to the home buyer's computer, such as being downloaded from the bank's website. The home buyer may then use the origination driver to provide digital file documents for the loan application, such as pay stubs, saving documents, credit reports and the like. The origination driver collects forensic data about the digital files.

Example 3

Intellectual Property

A company may have a new invention submission program for their employees. The employee may use a directory monitoring program to collect data about invention submission saved into a monitored directory. These new invention digital files may be transferred to a datastore, along with forensic data about the new invention digital file. This forensic data may be used to provide evidence and certification of the creator of the digital file and time of creation. This forensic data may be used to settle disputes regarding who was the first to invent.

Example 4

Records

A public records system collects and makes public record documents available to third parties. The public records system utilizes a datastore for the public records. Third parties can receive a copy of a digital file package, digital file and forensic data, upon request an upon paying a fee. The public records system uses an interface program, such as a framework, origination driver or directory monitoring program to transfer public records into the datastore.

The summary of the invention is provided as a general introduction to some of the embodiments of the invention, and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Figure 1:
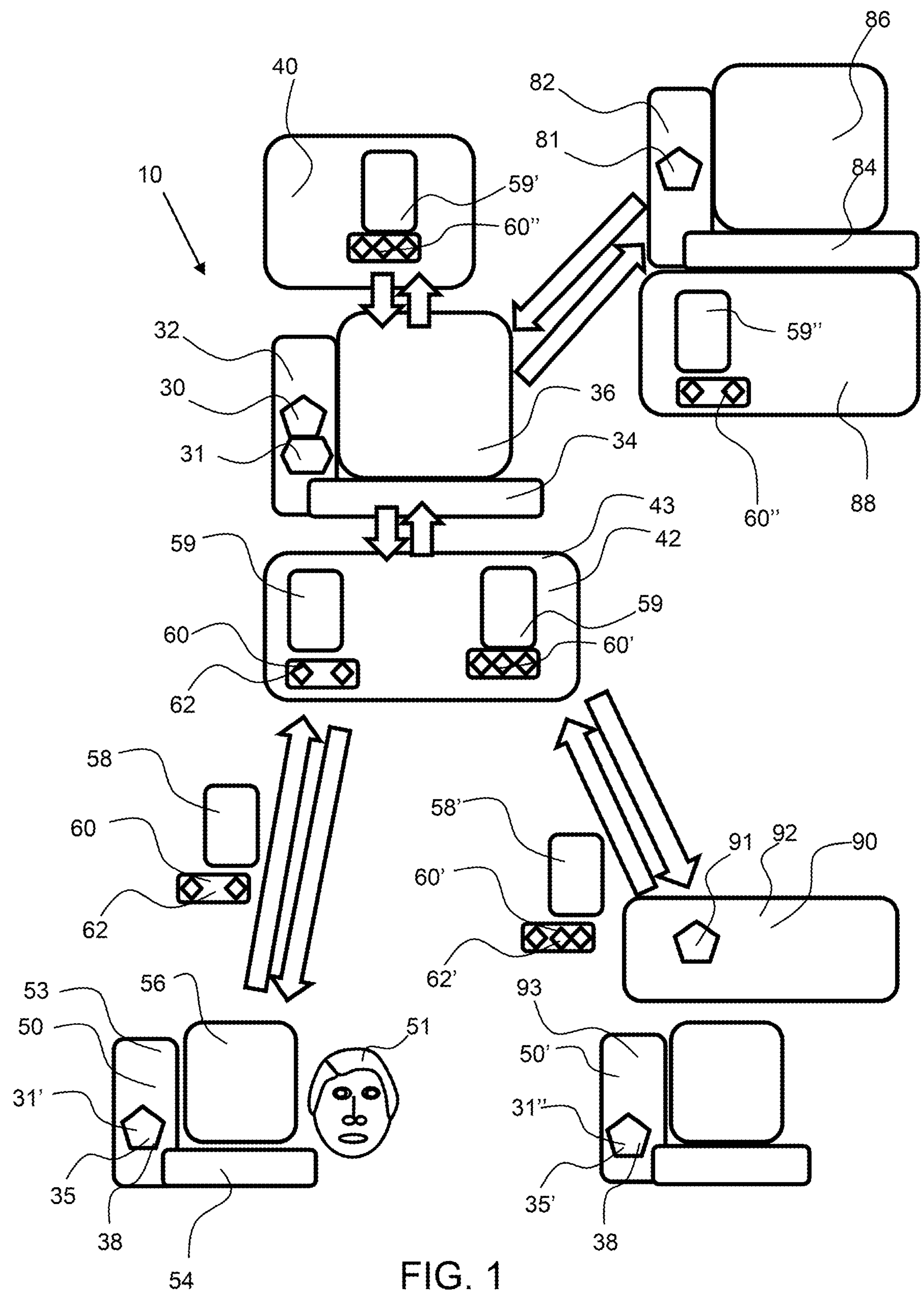
FIG. 1 shows a diagram of an exemplary digital file forensic accounting and management system that collects and stores digital files and associated forensic data that can be transferred to a third-party computer.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

As shown in FIG. 1, an exemplary digital file forensic accounting and management system 10 utilizes an interface program 31 to collect forensic data 60 from a file provider 51. The interface program may be running on a virtual machine, wherein a user interfaces with the virtual machine 42 by interfacing with a virtual machine website 43, for example. The user may open or log into the virtual machine to prepare a digital file 58, with the associated forensic data 60, to a database 40. An interface program 31 may be operated through the virtual machine and/or an interface program 31', or portion thereof, may be transferred to a file providing computer 50 and operate on said file providing computer to collect forensic data about a digital file 58, that is transferred to the datastore 40. A file provider 51 may use the file providing interface 54 and display 56 of the file providing computer 50 to create a file and send a digital file to the datastore through the virtual machine 42. The interface program 31 may be an origination driver 38 and a file providing user may use the origination driver to print the document to the system computer 32 or datastore 40. The forensic data may include the date and time of creation of the digital file, geodata, software creation data, certificates and the like. A system program 30 and/or a third-party interface program 81 may be used by a third-party computer 82 to obtain a verified digital file 59 and associated forensic data 60 from the datastore. An origination driver may utilize an encryption program 35, software or code to encrypt the digital file and/or forensic data before transfer to the datastore.

The virtual machine 42 may be configured to allow a file provider 51 to interface with a file origination interface 91, such as a file origination website 92 that create a digital file 58' that may include information from a file origination database 90. The digital file 58' and associated forensic data 60', may be transferred directly from the file origination website 92 or file origination computer 93 to the virtual machine 42 and datastore 40 to produce a verified digital file 59 having associated forensic data 60'. The file provider may input login credentials to the file origination interface 91 through the virtual machine such that the forensic data may include the file providing computer 50 information as well as the file origination interface 91, such as the file origination website 92 and/or file origination computer 93 forensic data.

The system computer 32 may receive the verified digital file 59 and directly deposit the verified digital file 59' to the datastore.

A third-party user may use a third party system interface 84 and display 86 of the third party computer 82 to obtain a verified digital file 59" from the datastore. A third party may interface with the system computer 32 via the virtual machine 42 through a virtual machine website 43. The third-party computing system may interface with a third party database 88 to store verified digital files 59" and forensic data 60" for said digital files. A system user may use the system interface 34 and display 36 of the system computer 32 to manage digital files within the datastore. In an exemplary embodiment, when the digital file is shared with a third party computer 82, permission from the file provider 51 may be required before the third party is given access to the verified digital file 59" from the data store 40. The third party may be allowed to print or download the files, but may not be given access to the file owner to access them inside the datastore. The third party may be allowed to print or download the digital file but they may not be provided the metadata or allowed to modify the original digital file in the datastore. A chain of custody of the digital file may be kept in association with the digital file in the datastore. This chain of custody may include forensic data of any third party access, download, or print of the digital file and may include metadata regarding the third party, date, time, geographical location and the like.

As shown in FIG. 1, an exemplary digital file forensic accounting and management system 10 collects and stores verified digital files 59, 59' and associated forensic data 60, 60' from a plurality of file providing computers 50, 50', respectively. The file providing computers may operate an interface program 31, 31' to collect forensic data, such as metadata 62, 62' that is transferred to the datastore 40 as a verified digital file 59' and associated forensic data 60". The forensic data may be collected as the file is create, such as when the interface software is a framework software. Again, a third party computer 82 may interface with the system computer 32 to obtain a verified digital file 59" and associated forensic data 60", which may be stored in a third party database 88.

As shown in FIG. 1, the file providing computer 50 may be a mobile device 53, such as a smart phone. The smart phone may interface with the system computer 32 through a virtual machine 42 such as the virtual machine website 43. An interface program 31' may be an App that operates on the mobile device and may have a feature to enable a scan to create a digital file 58. The App may have drivers to enable forensic data 60 to be collected. The scan may include taking a picture via the mobile device or mobile phone.

Figure 2:
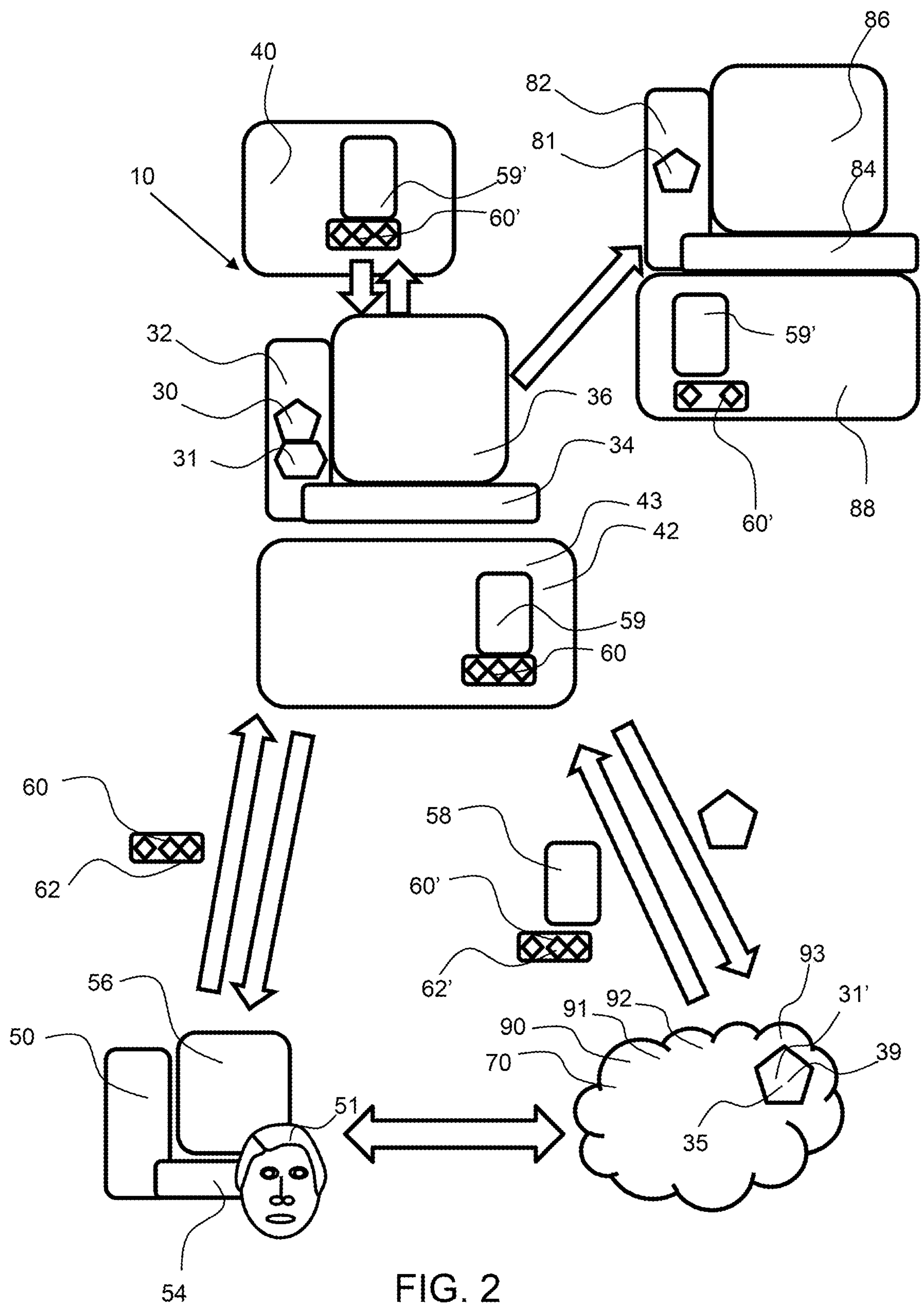
FIG. 2 shows a diagram of an exemplary digital file forensic accounting and management system wherein an interface program running on a file producing program collects forensic data when created in the file producing program by a file providing computer and wherein the forensic data is transferred to the system datastore along with the digital file by the file producing program.

As shown in FIG. 2, an exemplary digital file forensic accounting and management system 10 utilizes an interface program 31' running on a file producing program 70 to collect forensic data 60' about a digital file 58, such as when the file is created in the file producing program by a file providing computer 50. In an exemplary embodiment, a file origination interface 91 may have software that enables a file provider 51 to request that a digital file be transferred directly to the datastore 40. A file origination interface may include a file origination website 92 and interface that provides an option to the file provider 51, to transfer a digital file 58 to the datastore 40. A file provider may interface directly with the file producing program 70 having the file origination interface 91 that operates an interface program 31'. The file origination interface, such as an accounting software company, may subscribe to or have a license from the digital file forensic accounting and management system 10 to enable this direct submission of a digital file 58 and forensic data 60' directly to a datastore 40, for a file provider. The forensic data is transferred to the system datastore 40 along with the digital file 58 by the file producing program 70. For example, a file provider 51 may use the file providing interface 54 of the file providing computer 50 to interface with the file providing program 70, such as an accounting software, that the file providing user logs into to provide data to create a digital file. The file providing user may interface directly with the file providing program or through a virtual machine 42 as shown in FIG. 1. The accounting software, or file producing program, may run the interface program 31', such as a framework 39 while the digital file is created or when the digital file is saved and/or transferred to the datastore 40. The accounting software company may license the interface program or framework to enable the forensic data to be provided with digital files to the datastore. Note that the interface program may be running on a file origination interface 91, through a file origination website 92, wherein data from a file origination database 92 is utilized to create the digital file 58 that is transferred from the file origination interface to the datastore 40 and which may include forensic data 60 about the file providing computer 50 as well as forensic data 60' about the file origination interface 91. Again, a third party computer 82 may interface with the system computer 32 to obtain a verified digital file 59' and associated forensic data 60', which may be stored in a third party database 88. A framework 39 may utilize an encryption program 35, software or code, to encrypt the digital file and/or forensic data before transfer to the datastore. The framework may operate at least in part on the file origination computer 93 or may be accessed by the file origination computer through the virtual machine.

Figure 3:
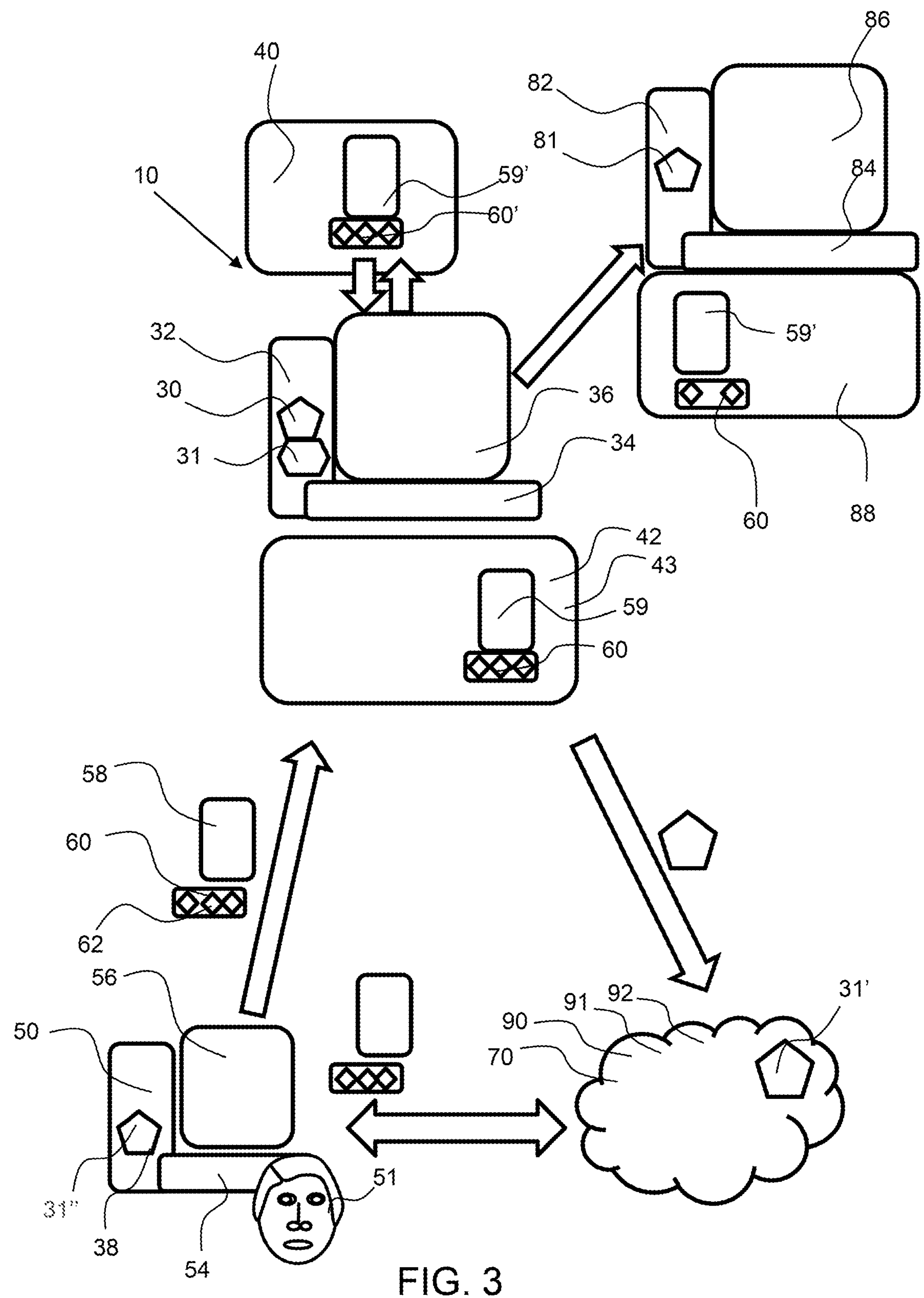
FIG. 3 shows a diagram of an exemplary digital file forensic accounting and management system wherein an interface program running on a file producing computer collects forensic data when created in the file producing program by a file providing computer and wherein the forensic data is transferred to the system datastore along with the digital file by the file providing computer.

As shown in FIG. 3, an exemplary digital file forensic accounting and management system 10 utilizes an interface program 31' running on a file producing program 70 to collect forensic data 60 about a digital file 58, such as when the file is created in the file producing program by a file providing computer 50. This forensic data 60 is transferred to the system datastore 40 along with the digital file 58 by the file providing computer 50. For example, a file providing user may use the file providing interface 54 of the file providing computer 50 to interface with the file providing program 70, such as an accounting software, that the file providing user logs into to create a digital file. The accounting software, or file producing program, may run the interface program 31' while the file is created or when the file is saved and/or transferred, such as to the datastore 40, or directly to a third party. In this embodiment, the digital file and associated forensic data may be transferred to the file providing computer 50 before being sent via the file providing computer using interface program 31", such as an origination driver 38, to the datastore. The file producing computer may also run the interface program 31' or a portion thereof. The file producing program 70, such as an accounting software that may be accessible through the internet via a website, may license the interface program 31' from the digital file forensic accounting and management system 10.

Figure 4:
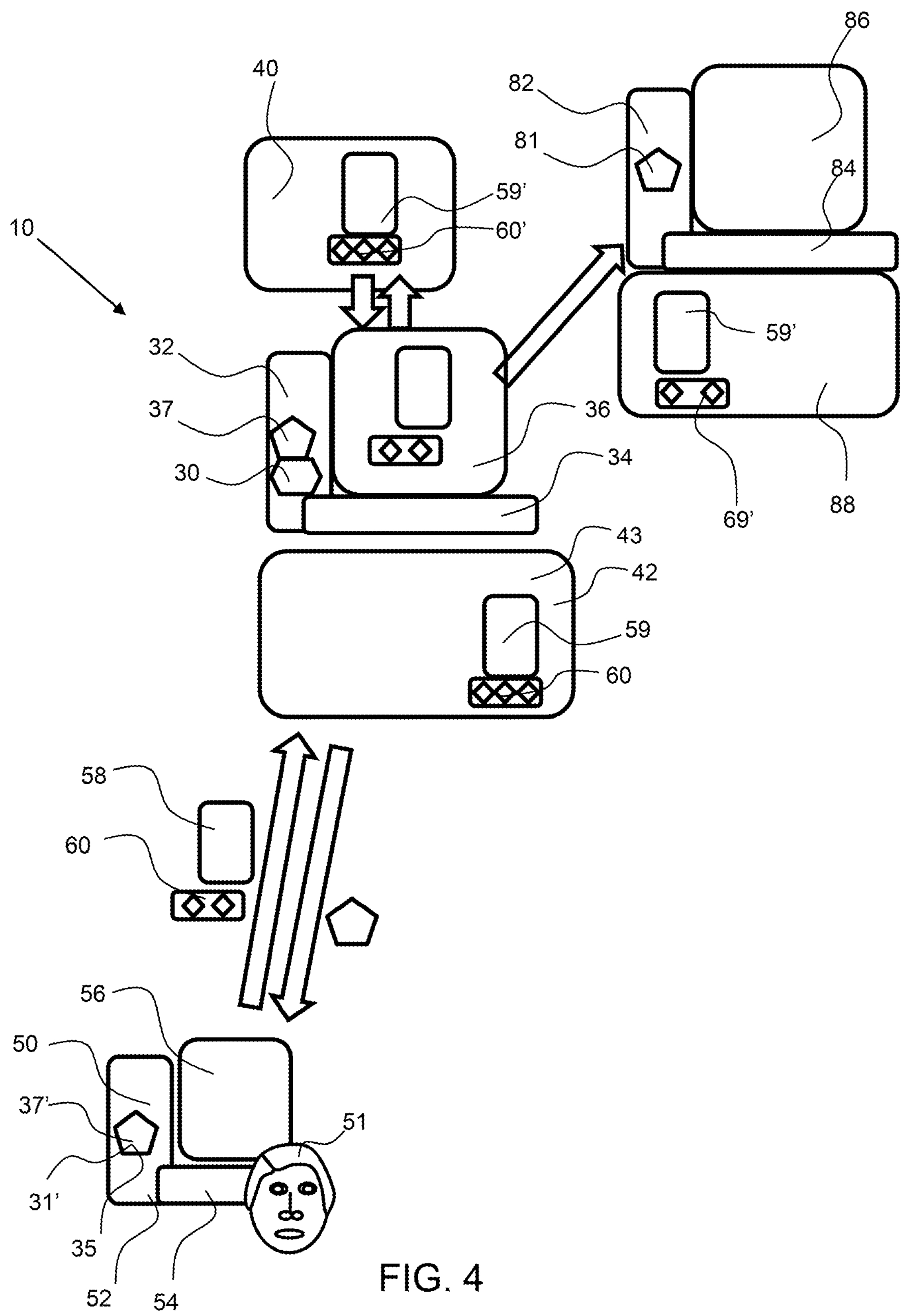
FIG. 4 shows a diagram of an exemplary digital file forensic accounting and management system wherein a directory monitoring interface program running on a file providing computer collects forensic data when a file in the directory is saved to the monitored directory. A file may not be allowed to be opened and manipulated within the directory. In an exemplary embodiment, a file saved in the monitored directory is transferred to a datastore.

As shown in FIG. 4, an exemplary digital file forensic accounting and management system 10 utilizes an interface program 31' to transfer a digital file to datastore 40. The interface program is a directory monitoring interface program 37 that is transferred to the file providing computer 50. As shown, a directory monitoring interface program 37 may operate on the system computer 32 and a directory monitoring interface program 37' may operate on the file providing computer 50 to monitor a directory 52 of the file providing computer. The directory monitoring program runs on the file providing computer to collect forensic data 60 when a file is saved to the monitored directory. A digital file 58 saved to the monitored directory may be automatically transferred to the datastore 40 each time a digital file in saved to the directory. Again, a third-party computer 82 may access the datastore to obtain a verified digital file 59 and forensic data 60 which may be stored in a third-party database 88 as a verified digital file 59' and verified forensic data 69'. A directory monitoring interface program 37 may utilize an encryption program 35, software or code to encrypt the digital file and/or forensic data before transfer to the datastore.

Figure 5:
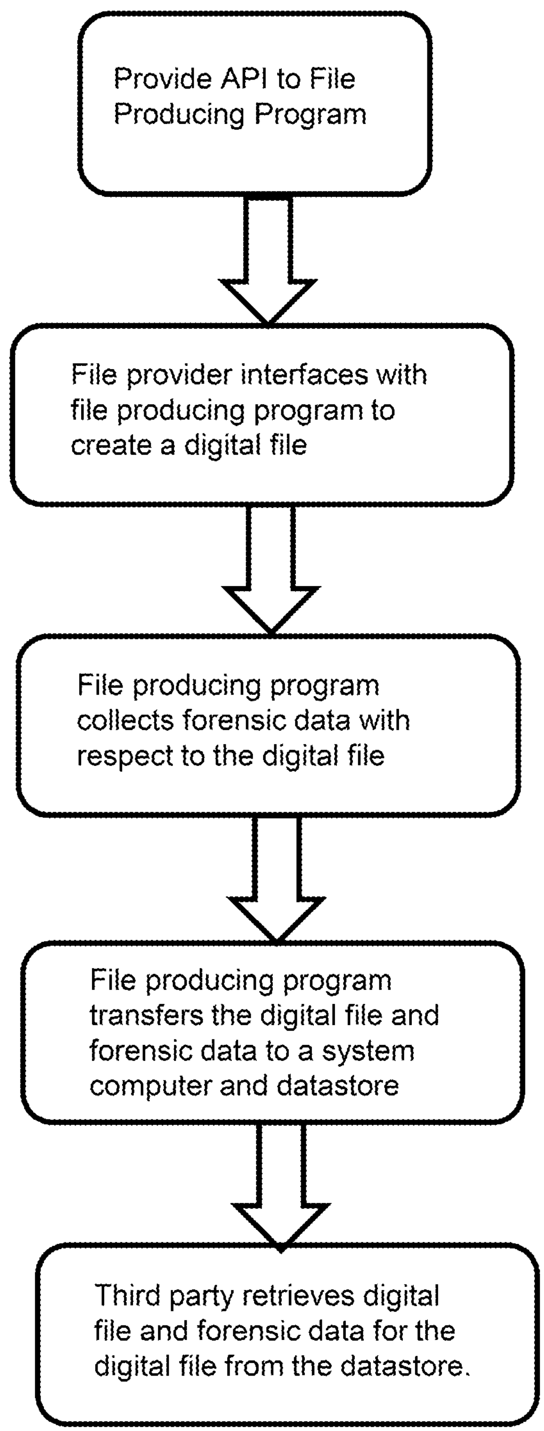
FIG. 5 shows a flowchart of an exemplary method utilized by a digital file forensic accounting and management system to collect a digital file and forensic data for said digital file using a framework that is operated by a file producing program.

As shown in FIG. 5, an exemplary method of a digital file forensic accounting and management system uses a framework or API that is operated by a file producing program to collect a digital file and forensic data for said digital file. The framework is provided to a file producing program and may be licensed by the file producing program. A file provider may interface with the file producing program, such as an accounting program, to create a digital file and the framework may collect forensic data for this created digital file. The digital file and forensic data may then be transferred to a system computer and datastore for retrieval by a third party, such as an accountant. The file provider may view the digital file and/or forensic data but may not be able to alter it in any way after created. For example, a business owner may utilize an accounting program, the file producing program, to produce a report by providing financial input to the system. A framework integrated with the file producing program may collect the forensic data with respect to the digital file. The digital file and forensic data may be transferred to the datastore and the business owner's accountant may retrieve the digital file and forensic data to prepare a tax return, for example.

Figure 6:
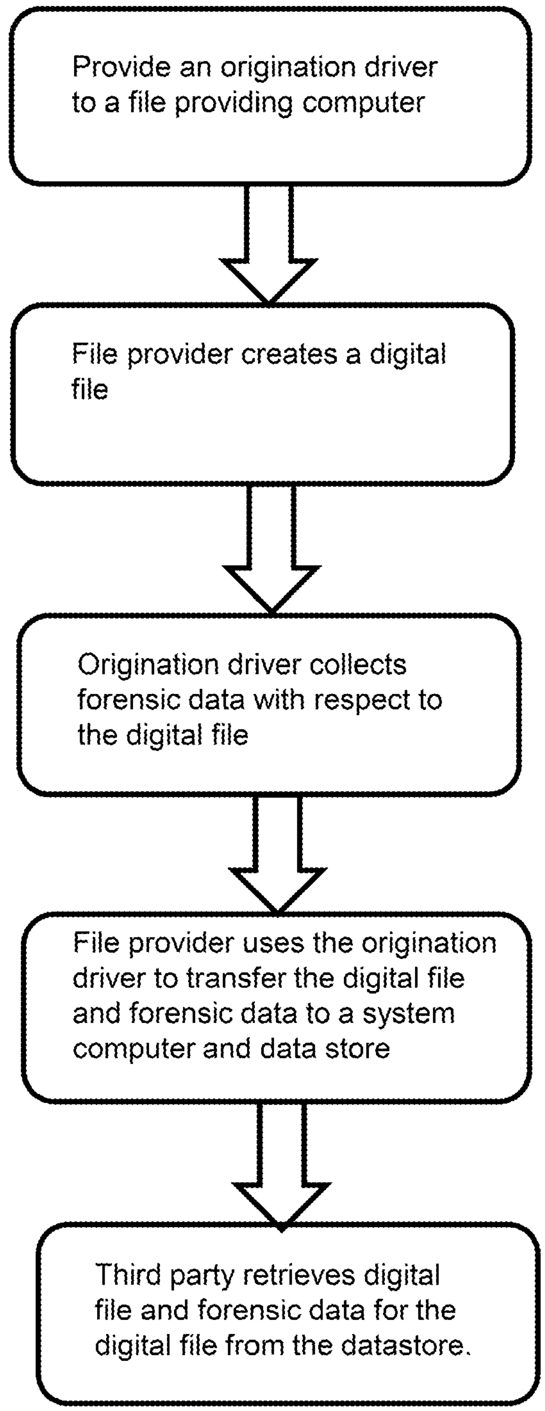
FIG. 6 shows a flowchart of an exemplary method utilized by a digital file forensic accounting and management system to collect a digital file and forensic data for said digital file using an origination driver that is operated by a file providing computer.

As shown in FIG. 6, an exemplary method of a digital file forensic accounting and management system uses an origination driver that is operated by a file providing computer to collect a digital file and forensic data. A file provider may download an origination driver from a system computer or system database onto a file providing computer. The file provider may then produce a file and the origination driver may collect forensic data about the digital file that is transferred, along with the digital file, to a datastore. For example, an employee may have a new idea for an invention and may want to submit it to their employer. The employer may have an idea submission program that requires the employee to utilize the origination driver to submit the idea to the companies datastore. The forensic data may include the geodata, a time stamp and the like.

Figure 7:
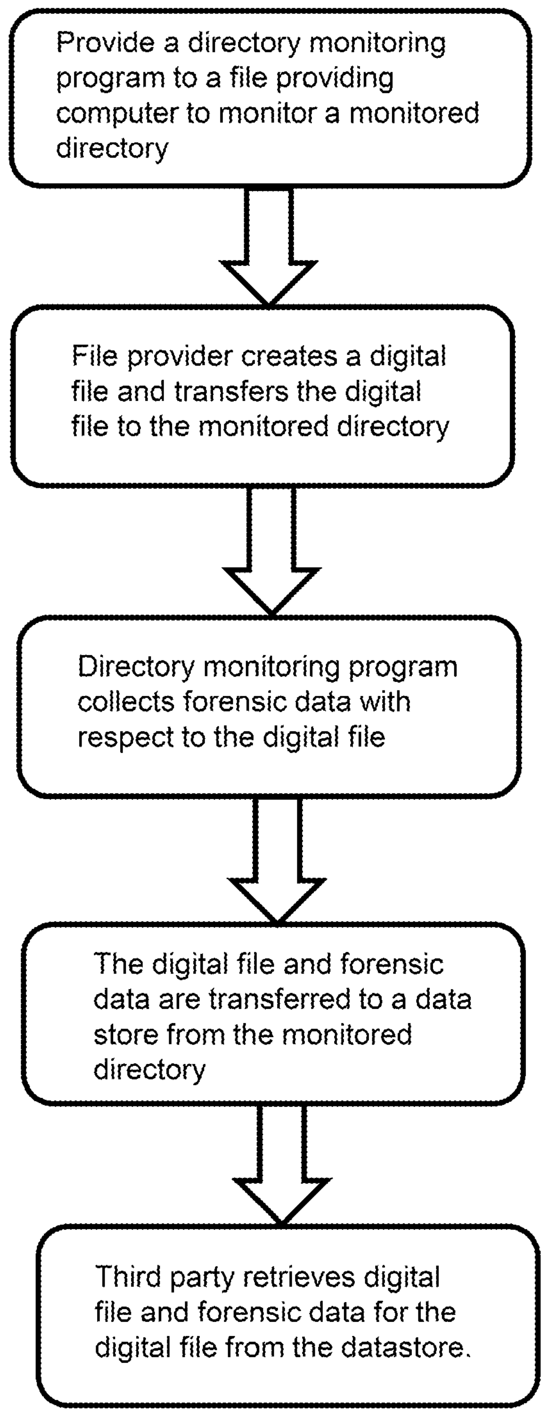
FIG. 7 shows a flowchart of an exemplary method utilized by a digital file forensic accounting and management system to collect a digital file and forensic data for said digital file using a directory monitoring program that is operated by a file providing computer.

As shown in FIG. 7, an exemplary digital file forensic accounting and management system uses a directory monitoring program that is operated by a file providing computer to collect a digital file and forensic data. A file providing computer may receive a directory monitoring program, such as from a system computer, a system database or a file producing program. The file provider may produce a digital file and then save the file to a monitored directory. The directory monitoring program may collect forensic data about the digital file as it is saved to the monitored directory. The saved digital file and associated forensic data may be transferred to a datastore. Each new digital file saved to the monitored directory, may be transferred to the datastore along with the associated forensic data. A file provider may not have access to the monitored directory except to save new files therein. Files in the monitored directory may not be allowed to be opened and modified by a file provider.

Figure 8:
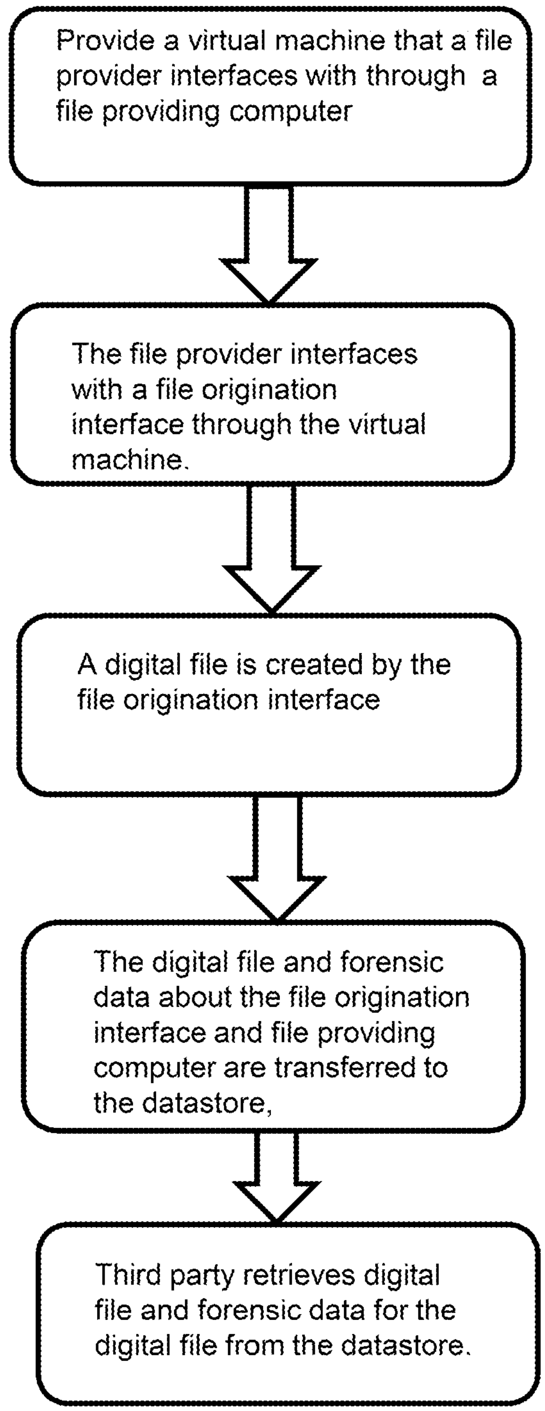
FIG. 8 shows a flowchart of an exemplary method utilized by a digital file forensic accounting and management system to collect a digital file and forensic data for said digital file using a virtual machine that a file provider uses to interface with a file origination interface, such as a website to produce a digital file.

As shown in FIG. 8, an exemplary digital file forensic accounting and management system uses a virtual machine that a file provider interfaces with to produce a digital file via a file origination interface. An interface program may be running on a file origination interface through a file origination website, wherein data from a file origination database is utilized to create the digital file. The digital file is transferred from the file origination interface to the datastore along with forensic data about the file providing computer as well as forensic data about the file origination interface.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of managing a digital file along with associated forensic data for the digital file comprising:

a) providing a digital file forensic accounting and management system comprising:
   i) a file providing computer;
   ii) an interface program;
   iii) a datastore;
b) utilizing the interface program to collect forensic data about an original digital file;
c) transferring said original digital file to said datastore;
d) saving said original digital file in the datastore;
e) transferring said forensic data from said original digital file to said datastore
   wherein the forensic data includes origination data for said original digital file;
   wherein the origination data includes an address of said file providing computer used for receiving the original digital file;
   wherein the file providing computer is a mobile device;
   wherein the interface program is a mobile App; and
   wherein the mobile App includes a driver to collect forensic data about a file produced by the mobile device;
f) retrieving said original digital file from the datastore by said interface program or a second interface program;
g) recording a chain of custody when the original digital file is retrieved from the datastore,
   wherein the chain of custody includes retrieval forensic data of said interface program or said second interface program used to retrieve said original digital file; and
   wherein the original digital file cannot be modified by said interface program or said second interface program after being saved in the datastore.

2. The method of claim 1, wherein the forensic data comprises metadata.

3. The method of claim 1, wherein the forensic data comprises origination data that is associated with said file providing computer.

4. The method of claim 1, wherein the forensic data comprises geodata that is associated with said geographical location of the file providing computer.

5. The method of claim 1, wherein the interface program comprises an encryption program and wherein the digital file is encrypted when transferred to the datastore.

6. The method of claim 1, wherein the interface program comprises an encryption program and wherein the digital file and the forensic data are encrypted when transferred to the datastore.

7. The method of claim 1, wherein the interface program is configured on and operated by said file providing computer to collect said forensic data for the original digital file.

8. The method of claim 1, further providing a system computer and wherein the interface program is transferred to the file providing computer by a system computer and wherein said interface program collects forensic data from said file providing computer.

9. The method of claim 1, wherein the interface program is an origination driver.

10. The method of claim 9, wherein the origination driver collects forensic data of the original digital file, and wherein the original digital file and forensic data are transferred to the datastore by said origination driver.

11. The method of claim 1, wherein the interface program is a framework.

12. The method of claim 11, wherein the framework collects forensic data of the original digital file and wherein both the original digital file and forensic data are transferred to the datastore.

13. The method of claim 12, wherein the framework interfaces with the file providing computer and with a file software program to collect forensic data of the original digital file.

14. The method of claim 1, wherein the interface program is transferred to a file producing program that the file providing computer uses to create a digital file within the file producing program; and wherein the digital file is transferred to the datastore through the file providing program.

15. The method of claim 1, further comprising a virtual machine having a virtual machine website and wherein the file providing computer interfaces with a virtual machine website to transfer the digital file and said forensic data to the datastore.

16. The method of claim 1, further comprising:

a file origination computer;

wherein the file providing computer interfaces with said file origination computer to produce said digital file and said forensic data that is transferred to the datastore.

17. The method of claim 1, wherein the mobile device is a mobile phone.

18. The method of claim 1, wherein the mobile device has a camera and wherein the camera is used to take a picture of a digital file.

19. The method of claim 1, wherein the mobile device has a scanner and wherein the scanner is used to scan a digital file.

20. The method of claim 19, where the scanner includes a camera of the mobile device.

* * * * *